Patented Sept. 26, 1939

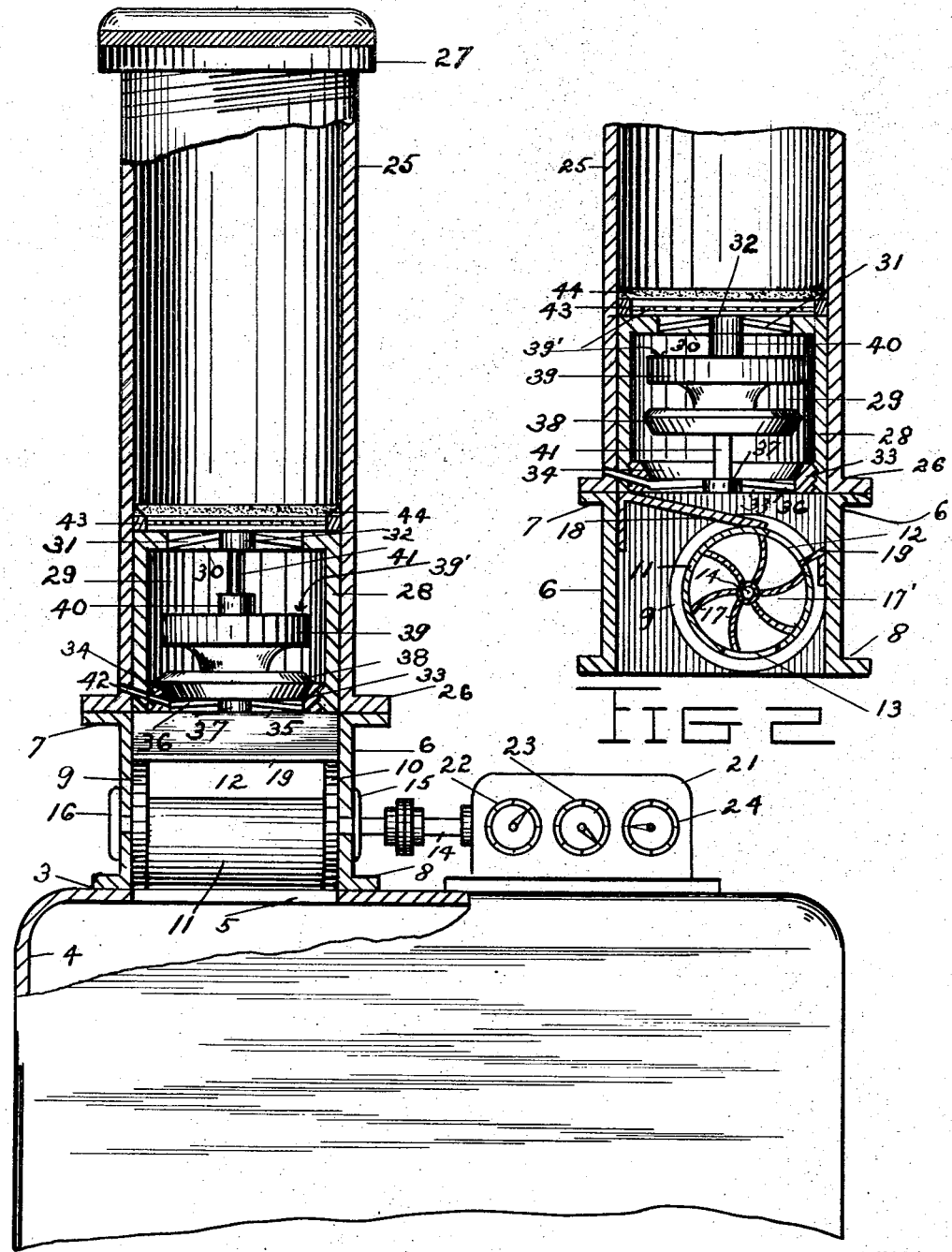

2,174,424

UNITED STATES PATENT OFFICE 2,174,424

LIQUID MEASURING DEVICE

Gibson Nall, Oklahoma City, Okla., assignor of one-half to Deward Spalding, Oklahoma City, Okla.

Application March 14, 1938, Serial No. 195,714

2 Claims. (Cl. 73—198)

This invention relates to an improved construction of liquid-measuring devices for storage tanks for vehicles, and for plants which supply gasoline to such tanks; and has for its object to provide in such devices means whereby when the gasoline is poured into the storage tank, the fluid will be forced down upon the blades and into the buckets of a bucket-wheel which is mounted upon a shaft which is coupled with the shaft of a quantity-indicator, so that the amount of gasoline being supplied into the tank may be indicated.

In this connection, it is designed to provide the bucket-wheel with a shaft suitably journalled in anti-leak bearings, and sufficiently extending beyond the device so as to be suitably coupled with said quantity indicator.

A primary and important feature of the invention is to provide means whereby when air, instead of gasoline, is introduced into the device, for the purpose of operating the bucket-wheel, the introduced air will force a valve, having an air pressure head, to a closed position, thus preventing the air from being directed to the buckets of the bucket-wheel.

It is found in the operation of motor-vehicles, particularly the truck type which consumes large quantities of gasoline, of advantage to be able to check up the driver's report as to the amount of gasoline paid for, and to provide a device through which the liquid is passed into the storage receptacle, so constructed that its measuring mechanism can not be tampered with, and also to provide an indicator or counter which will accurately show the amount of liquid which has passed through it and also to provide means for preventing any tampering with the air-controlled means, so that the latter can not be manually operated.

The prior art seems to indicate devices for the purpose of delivering gasoline to gasoline tanks through a measuring media, and also shows devices for shunting the air from the device, through an exhaust, but shows no means for receiving air pressure with which to seal the gasoline intake against the admission of air, so that the air may operate the bucket-wheel and the quantity indicator. Such a device is shown in the art, in the nature of Letters Patent of the United States, issued to William F. Mowry, March 9, 1926, and bearing number 1,575,782.

On the sheet of drawings accompanying and forming a part of this specification,

Figure 1 is an elevation view, partly in section, of a device made in accordance with the invention, and Figure 2 is an elevation view in detail, and in section, to show a cross section of the bucket-wheel and the deflecting plates.

In the several views, like characters of reference will indicate like parts.

Welded at 3 to the upper side of a tank 4, which is provided with an opening 5, from which the usual filler tube has been removed or omitted, is a rectangular housing 6 which is provided with an upper and a lower flange 7 and 8.

Within this housing 6 are a pair of rims 9 and 10 in which is mounted a shell 11 having an upper intake opening 12, and a lower exhaust opening 13.

Journalled in the walls of the housing 6 is a shaft 14 which is provided with anti-leak bearings 15 and 16, and upon this shaft is affixed a shell from which radiates a series of blades 17 which form buckets 17' and which have their ends fitted against the inner wall of the shell 11.

Associated with this shell 11, and secured thereto are deflectors 18 and 19 which are secured to the walls of the housing 6.

Mounted upon the upper side of the tank 4 in proximity to the device, is a quantity-indicator 21 which is provided with the usual indicating dials 22, 23 and 24, and which is coupled to the shaft 14, and when the weight of the gasoline in the buckets 17' turns the bucket-wheel, the quantity-indicator will register the amount of gasoline running into the tank 4.

Mounted upon the housing 6 is a filler-tube 25, having a flange 26 which is secured to the flange 7 of the housing 6, and this filler-tube is screw-threaded at the top to receive a cap 27.

Within this tube is sweated a shell 28 forming a well 29 and this shell is provided with an upper opening 30 in which, by spiders 31 is supported a bearing 32. In the lowermost portion of this shell 28 is screw-threaded a valve-seat-ring 33 having a valve seat 34 and in the opening 35 in this ring, by spiders 36 is supported a bearing 37.

Seated, by gravity, upon the seat 34 is a float-valve 38 which is connected with a float 39 which is provided with an air pressure face 39' of predetermined area, and a stop 40, and this float rises and falls upon a guide stem 41 borne in the bearings 32 and 37.

This float 39 is so shaped that when the gasoline is in the well 29 it will rise until the stop 40 bears to the underside of the bearing 32.

This will both open the valve 38 from the seat 34 and keep the float from closing the opening 30 so that the gasoline may flow on through the well and into the buckets 17' of the bucket wheel, and operates the quantity indicator 21.

If an attempt is made to introduce air into the filler-tube 25 for the purpose of driving the bucket-wheel and causing the quantity indicator to register, as soon as the well becomes emptied of gasoline so that the float can drop the valve upon the valve seat, the air pressure distributing upon the float air face 39' will force the valve 38 hard to the seat 34 and thus prevent the introduction of air into the measuring buckets.

The under surface of the float is of lesser area than that of the pressure surface 39' and therefore when the air is directed into the well the pressure on the upper surface 39' will be in excess of any pressure at the underside of the float and serve to press the valve to its seat.

To provide for the exhaust of the pressure from within the tank 4, a vent 42 is provided which passes both through the valve ring 33 and the wall of the filler tube 25, and this vent is in proximity to the valve seat 34.

Above the shell 28 is placed a screen 43 which may be mechanically sealed in place, as, for instance, by welding at 44 to prevent access to the float and shell.

Having thus set forth this invention, I claim:

1. A liquid measuring device consisting of a housing attachable to a storage-tank, a bucket-wheel rotatably mounted therein, anti-leak bearings therefor, a quantity-indicator associated with the bucket-wheel, a filler-tube secured to the housing, a valve seat within the filler-tube, a valve connected with the seat, a float for raising and lowering the valve, an air pressure face upon the upper side of the float for driving the valve to its seat under air pressure, a stop for said float, and a fixed screen above the float in the filler tube.

2. A liquid measuring device consisting of a housing attachable to a storage-tank, a bucket-wheel rotatably mounted therein, means for rotatably supporting the bucket-wheel, anti-leak bearings for said bucket-wheel supporting means, a quantity indicator connected with the bucket-wheel, a filler-tube secured to the housing, a shell within the filler-tube and having an upper opening, a valve-seat ring having a vent and secured in the wall of the shell, a bearing supported in the opening in said ring, a float-valve in said shell and adapted to be pressed upon and raised from the seat, a float within the shell for operating the valve when the shell is partially liquid filled, an upper air-pressure face for the float to allow the float to force the float-valve to seated position when air is driven on said surface, and means to forbid manual access to the shell and the float.

GIBSON NALL.